United States Patent

Pagano et al.

[11] Patent Number: 5,123,196
[45] Date of Patent: Jun. 23, 1992

[54] FISHING LURE

[76] Inventors: Ernest Pagano, 58 School St., E. Hartford, Conn. 06108; David Davidson, P.O. Box 21, Marlborough, Conn. 06447

[21] Appl. No.: 619,178
[22] Filed: Nov. 27, 1990
[51] Int. Cl.⁵ .............................................. A01K 83/00
[52] U.S. Cl. ..................... 43/37; 43/44.88; 43/42.02
[58] Field of Search ............ 43/37, 44.88, 44.92, 43/42.02

[56] References Cited

U.S. PATENT DOCUMENTS

| | | | |
|---|---|---|---|
| 2,153,489 | 4/1939 | Whitis | 43/42.02 |
| 2,546,614 | 3/1951 | Prentice | 43/37 |
| 2,888,771 | 6/1959 | Stephens et al. | 43/44.88 |
| 2,895,255 | 7/1959 | Irwin | 43/44.88 |
| 3,168,790 | 2/1965 | Creasey | 43/44.88 |

Primary Examiner—Richard K. Seidel
Assistant Examiner—Chuck Y. Mah
Attorney, Agent, or Firm—Fishman, Dionne & Cantor

[57] ABSTRACT

A fishing device is disclosed. The device includes a float for maintaining a hook at a distance below the surface of a body of water and a contractile assembly, secured between the float and the hook for contracting a response to a hook strike by a fish, to forcefully displace the hook toward the float, thereby setting the hook. Alternatively, the device includes a fishing lure body and a contractile assembly for contracting, in response to a hook strike by a fish, into the lure body, thereby setting the hook.

16 Claims, 2 Drawing Sheets 5,123,196

FISHING LURE

TECHNICAL FIELD

The present invention relates to fishing devices.

BACKGROUND OF THE INVENTION

A number of artificial lures for fish, see e.g. U.S. Pat. Nos. 945,901, 2,641,861 and Canadian Patent 642,093, include detent and spring mechanisms for deploying fishing hooks from a housed position within a lure body. The device of the Canadian patent also provides a recoil movement of the deployed hook so that the hook engages the mouth of the fish.

Each of the above discussed devices is mechanically complex.

SUMMARY OF THE INVENTION

A fishing device is disclosed. The device includes a float means for maintaining a fishing hook at a distance below a surface of a body of water and contractile means, removably secured between the float means and the hook, for contracting to displace the hook toward the float means.

In an alternative embodiment, the device includes a lure body, contractile means for contracting with the lure body and means for securing a fishing hook to the contractile means.

DETAILED DESCRIPTION OF THE INVENTION

Figures 1, 2, 3:
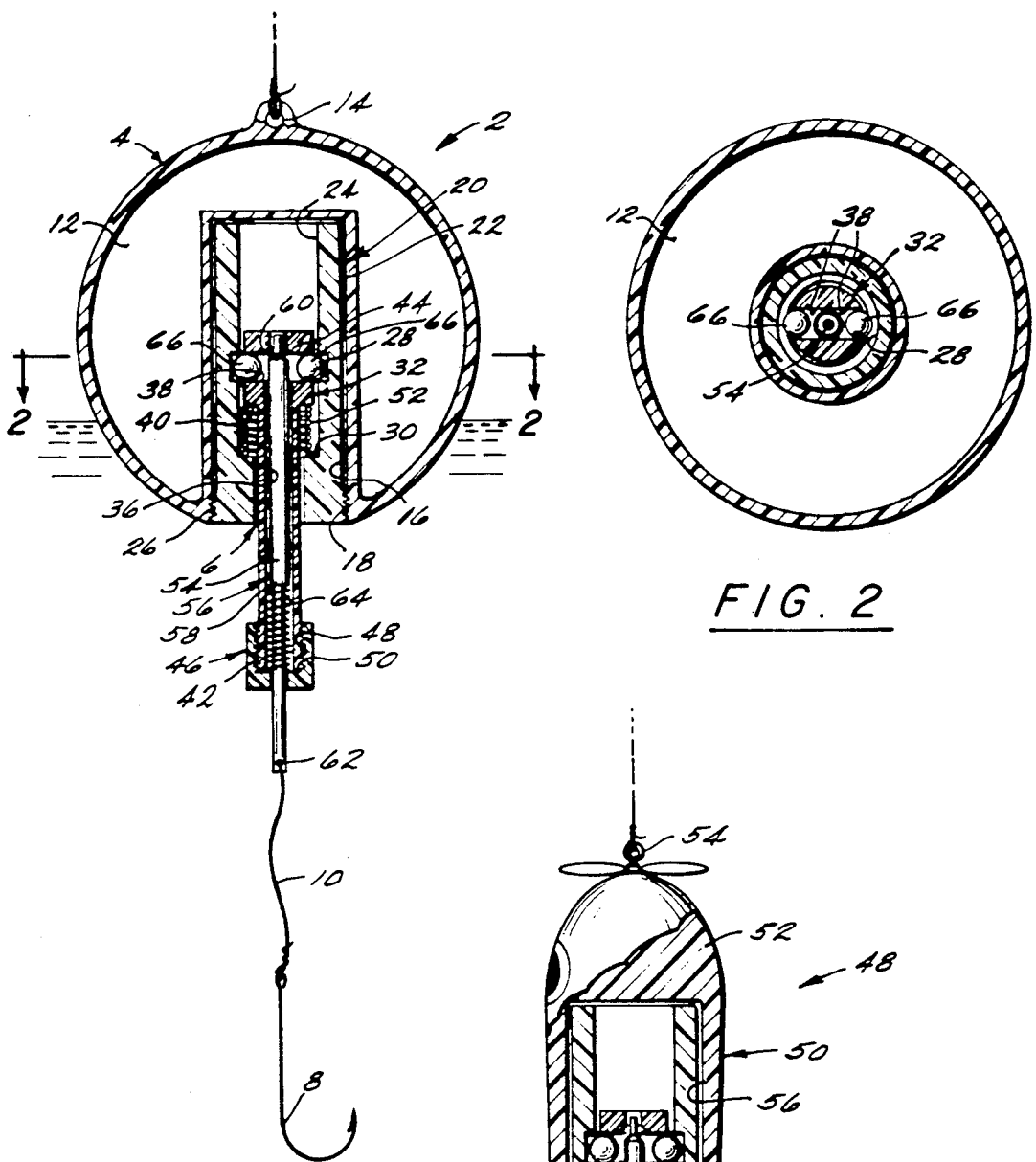
FIG. 1 shows a longitudinal cross sectional view of a fishing device of the present invention with retractable member 32 in the extended position.
FIG. 2 shows a transverse cross sectional view along line 2—2 in FIG. 1.
FIG. 3 shows a longitudinal cross sectional view of an alternative embodiment of the fishing device of the present invention.

Referring to FIGS. 1, 2 and 3, a fishing device 2 of the present invention includes a spherical float 4 and a contractile assembly 6. A fishing hook 8 is secured to the contractile assembly 6 by fishing line segment 10.

The spherical float 4 includes a spherical body portion 12, an eyelet 14 for securing a fishing line to the body portion 12. The body includes an inner circumferential surface 16 defining bore within the body 12. The circumferential surface 16 includes a threaded portion 18. The body 12 may comprise any durable, water resistant, low density material. Preferably, the body 12 comprises a hollow polymeric sphere. Alternatively, the body 12 may comprise a polymeric closed cell foam.

The contractile assembly includes a housing 20. The housing 20 has an outer diametral surface 22 and an inner diametral surface 24. The outer diametral surface 22 includes a threaded portion 26 for engaging threaded portion 18 of the inner diametral surface of the float body 12 to removably secure the contractile assembly 6 within the bore defined in float body 12. The inner circumferential surface includes an annular notch 28 and an annular shoulder 30.

A retractable member 32 is slidably received within the housing 20. The retractable member 32 includes an outer diametral surface 34, a longitudinal inner diametral surface 36 and a transverse inner diametral surface 38. The outer diametral surface 34 includes an outer shoulder 40 and a threaded portion 42. The inner diametral surface includes a shoulder 44. The transverse inner diametral surface 38 defines a pair of radial chambers communicating between the outer diametral surface 34 and the longitudinal inner diametral surface 36. A cap 46 is secured to the retractable member 32. The cap 46 includes a threaded inner diametral surface for engaging the threaded portion 42 of the outer surface 34 of the retractable member 32 and a shoulder 50.

The retractable member 32 has an extended position and a retracted position relative to the housing 20. In the extended position, shown in FIGS. 1 and 2, the retractable member extends from the housing 20. In the retracted position, shown in FIG. 3, the retractable member 32 is retracted within the housing 20. A first coil spring 52 is disposed between shoulders 30 and 40 to urge the retractable member 32 into the retracted position.

A spindle 54 is slidably received within the retractable member 32. The spindle 54 has an outer diametral surface 56 and includes a first outer shoulder 58, a second outer shoulder 60 and a transverse bore 62.

Figure 4:
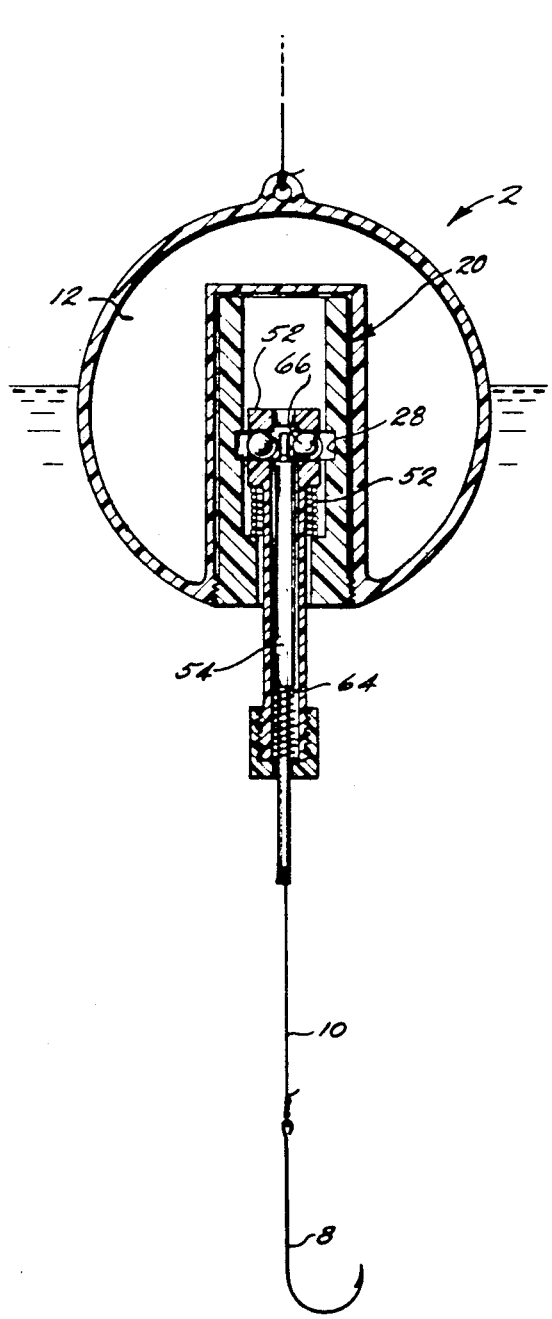
FIG. 4 shows a longitudinal cross sectional view of the fishing device shown in FIG. 1 as spherical member 66 disengage notch 28.
Figure 5:
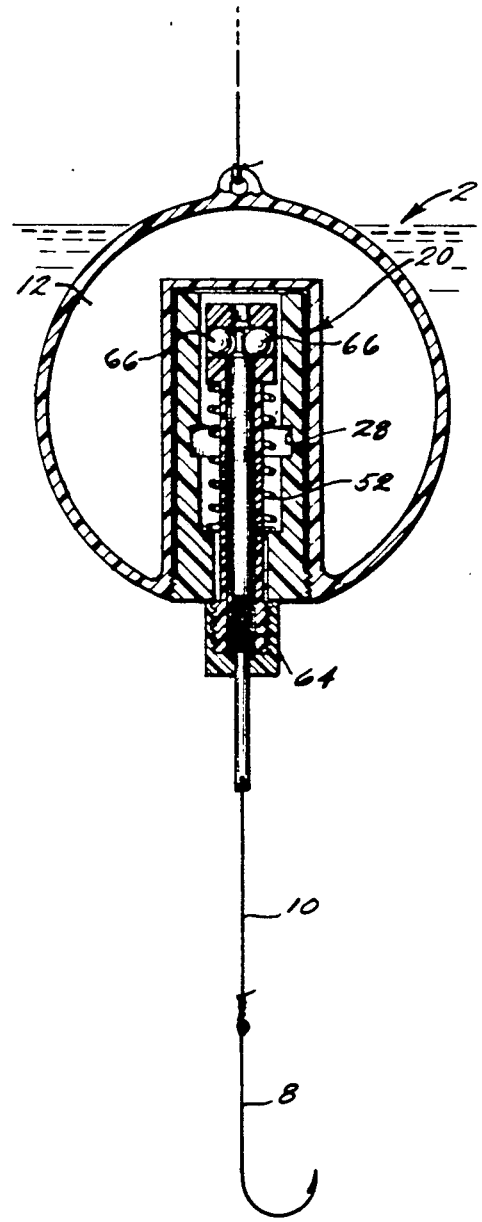
FIG. 5 shows a longitudinal cross sectional view of the device shown in FIG. 1 with retractable member 32 in the retracted position.

The spindle 54 has a retracted position and an extended position relative to retractable member 32. In the retracted Position, shown in FIGS. 1 and 2, the spindle 54 is retracted within retractable member 32 so that outer shoulder 60 of the spindle 54 contacts inner shoulder 44 of the retractable member 32 and outer circumferential surface 56 of spindle 54 contacts spherical members 66 to urge spherical members 66 radially outwardly from retractable member 32 and into engagement with notch 28 to thereby maintain retractable member 32 in its extended position relative to housing 20. In the extended position, shown in FIG. 4 and 5, the spindle 54 extends from retractable member 32 so that outer shoulder 60 is displaced below the radial chambers defined in retractable member 32, thereby allowing spherical members 66 to retract within the retractable member 32 and disengage notch 28 as shown in FIG. 4. Disengagement of spherical members 66 and notch 28 allows retractable member 32 to enter its retracted position relative to housing 20 as shown in FIG. 5.

A second coil spring 64 is disposed between the first outer shoulder 58 and the shoulder 50 of cap 46 to urge the spindle 54 to retract within the retractable member 58.

An alternative embodiment 48 of the device of the present invention is shown in FIG. 3. In the alternative embodiment the spherical float 4 is replaced by a fishing lure cover 50. The cover 50 includes fishing lure body 52 and an eyelet 54 for attaching a fishing lure to the lure body 52. The lure body 52 includes an inner diametral surface 56. The inner diametral surface 56 includes a threaded portion 58 for securing the cover 50 to the contractile assembly of the present invention.

To us either embodiment of the devices of the present invention, the contractile mechanism 6 is brought into the position shown in FIG. 1, i.e. retractable member 22 is extended from housing 20 thereby compressing spring 52 and spindle 54 is retracted within retractable member 32 to urge spherical members into engagement with notch 28. So armed, the device of the present invention is used according to conventional techniques. Once a tensile force sufficient to compress spring 64 is applied to spindle 54, e.g. if a fish strikes hook 8, spindle 58 enters its extended position, spherical members 66 disengage notch 28 and spring 5 extends to retract retractable member 32 thereby forcefully displacing hook 8 toward housing 20. The forceful displacement of hook 8 provides a driving force for automatically setting hook 8 in the striking fish.

Since the device of the present invention automatically contracts to forcefully displace a fishing hook a moments inattention on the part of the fisherman will not necessarily result in a lost catch.

While preferred embodiments have been shown and described, various modifications and substitutions may be thereto without departing from the spirit and scope of the invention. Accordingly, it is to be understood that the present invention has been described by way of illustrations and not limitations.

What is claimed is:

1. A fishing device, comprising:
   float means for maintaining a hook at a distance below a surface of a body of water; said float means having a cylindrical bore defined therein,
   contractile means, removably secured within said bore, for contracting to displace said hook toward said float means, said contractile means comprising:
   housing means for removably securing the contractile means within the float;
   retractable means, slidably received within the housing means, for retracting within the housing means to thereby contract the contractile means, said retractable means having a first position, wherein the retractable means extends from the housing means, and having a second position, wherein the retratable means is retracted within the housing means;
   first resilient means for urging the retractable means into the second position;
   detent means for maintaining the retractable means in said first position;
   trigger means for defeating the detent means; and
   means for securing the fishing hook to the trigger means.

2. The device of claim 1, wherein said housing means includes an inner circumferential surface and said detent means comprises a notch in said circumferential surface and displaceable means for engaging said notch to maintain the retractable means in the first position.

3. The device of claim 2, wherein said retractable means comprises a cylindrical member having an outer circumferential surface and having an inner circumferential surface defining a longitudinal bore through said member, said cylindrical member defining a pair of radial chambers each communicating between said inner circumferential surface and said outer circumferential surface, wherein said notch comprises an annular groove defined in the inner circumferential surface of said housing means and wherein said displaceable means comprise a pair of spherical members disposed within said chambers.

4. The device of claim 3, wherein the housing means extends from a first open end to a second open end and includes an inner annular shoulder extending radially inwardly from said inner circumferential surface of said housing at said first open end of said housing, said cylindrical member extends from a first end to a second end and includes an outer annular shoulder extending radially outwardly from said outer circumferential surface of said cylindrical member; and
   said first resilient means is disposed between said inner and outer annular shoulders.

5. The device of claim 4, wherein said trigger means comprises spindle means, slidably received within said cylindrical member, for maintaining said spherical members in engagement with said notch, said spindle means having a first position wherein said spindle means is withdrawn within said cylindrical member and maintains said spherical members in engagement with said notch and having a second position wherein said spindle means extends from said cylindrical member and allows the spherical members to disengage said notch;
   second resilient means for urging said spindle means into said first position.

6. The device of claim 5, wherein:
   said cylindrical member extends from a first open end to a second open end and includes an inner shoulder surrounding said first open end;
   said spindle means includes an outer circumferential surface and includes an outer annular shoulder extending radially outwardly from said outer circumferential surface; and
   said second resilient means is disposed between said inner and outer annular shoulders.

7. The lure of claim 5, wherein the means for securing comprises a transverse bore through said spindle means.

8. The device of claim 5, wherein said first resilient means comprises a coil spring having a relatively high stiffness and said second resilient means comprises a coil spring having a relatively low stiffness.

9. A fishing device, comprising:
   a fishing lure body, said lure body defining a longitudinal bore extending partially therethrough,
   contractile means, removably secured within the longitudinal bore, for contracting within said lure body, said contractile means comprising:
   housing means for removably securing the contractile means within the lure body;
   retractable means, slidably received within the housing means, for retracting with the housing means to contract the contractile means, said retractable means having a first position, wherein the retractable means extends from the housing means, and having a second position, wherein the retractable means is retracted within the housing means;
   first resilient means for urging the retractable means into the second position;
   detent means for maintaining the retractable means in said first position;
   trigger means for defeating the detent means; and
   means for securing a fishing hook to the trigger means.

10. The lure of claim 9, wherein said housing means includes an inner circumferential surface and said detent means comprises a notch in said circumferential surface and displaceable means for engaging said notch to maintain the retractable means in the first position.

11. The lure of claim 10, wherein said retractable means comprises a cylindrical member having an outer circumferential surface and an inner circumferential surface defining a longitudinal bore through said member, said cylindrical member defining a plurality of chambers each radially communicating between said inner circumferential surface and said outer circumferential surface, wherein said notch comprises an annular groove defined in the inner circumferential surface of said housing means and wherein said displaceable means comprise a plurality of spherical members disposed within said chambers.

12. The lure of claim 11, wherein the housing means extends from a first open end to a second open end and includes an inner annular shoulder extending radially inwardly from said inner circumferential surface of said housing at said first open end of said housing said cylindrical member extends from a first end to a second end and includes an outer annular shoulder extending radially outwardly from said outer circumferential surface of said cylindrical member: and said first resilient means is disposed between said inner and outer annular shoulders.

13. The lure of claim 12, wherein said first resilient means comprises a coil spring having a relatively high spring constant and said second resilient means comprises a coil spring having a relatively low spring constant.

14. The lure of claim 11, wherein said triqger means comprises spindle means, slidably received within said cylindrical member, for maintaining said spherical members in engagement with said notch, said spindle means having a first position wherein said spindle means is withdrawn within said cylindrical member and maintains said spherical members in engagement with said notch and having a second position wherein said spindle means extends from said cylindrical member and allows the spherical members to disengage said notch;

second resilient means for urging said spindle means into said first position.

15. The lure of claim 14, wherein:

said cylindrical member extends from a first open end to a second open end and includes an inner annular shoulder surrounding said first open end;

said spindle means includes an outer circumferential surface and includes an outer annular shoulder extending radially outwardly from said outer circumferential surface; and said second resilient means is disposed between said inner and outer annular shoulders.

16. The lure of claim 9, wherein the means for securing comprises a transverse bore through a spindle means.

* * * * *